Figure 1:
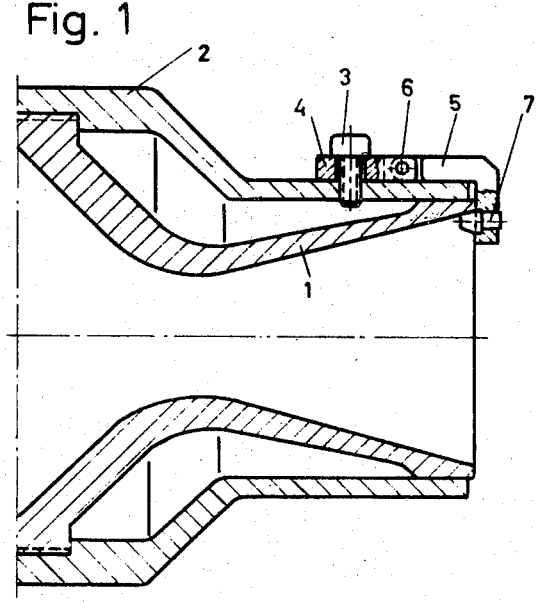

United States Patent [19]
Björnson et al.

[11] 3,850,387
[45] Nov. 26, 1974

[54] DEFLECTION DEVICE FOR ROCKET MOTOR PROPELLED PROJECTILES

[75] Inventors: Björn Ove Björnson; Yngve Bertil Strådalen, both of Karlskoga, Sweden

[73] Assignee: AB Bofors, Bofors, Sweden

[22] Filed: July 16, 1973

[21] Appl. No.: 379,661

[30] Foreign Application Priority Data
July 31, 1972 Sweden.............................. 9944/72

[52] U.S. Cl.............. 244/3.22, 60/230, 239/265.37
[51] Int. Cl............................................ F42b 13/30
[58] Field of Search .... 60/230; 239/265.15, 265.19, 239/265.37, 265.43; 244/3.22

[56] References Cited
UNITED STATES PATENTS

| | | | |
|---|---|---|---|
| 2,644,296 | 7/1953 | Sanz et al. | 244/3.21 |
| 2,694,898 | 11/1954 | Stauf | 239/265.37 |
| 2,879,955 | 3/1959 | Zborowski | 60/230 |
| 3,079,752 | 3/1963 | Thielman | 239/265.15 |
| 3,246,468 | 4/1966 | Wilhite | 239/265.15 |

*Primary Examiner*—Verlin R. Pendegrass
*Attorney, Agent, or Firm*—Elliott I. Pollock

[57] ABSTRACT

A rocket propelled projectile is provided with a deflection device for temporarily deflecting the direction of flow of a gas jet issuing from the nozzle of the rocket motor. The deflection device comprises a flow deflecting member which is pivotally attached to the rocket motor and which extends to an active position wherein the flow deflecting member overlies a portion of the exhaust area of the nozzle. The deflecting member is temporarily retained in its active position by a locking pin which is positioned within the nozzle in the path of flow of the gas jet. The locking pin is eroded by the gas jet to release the flow deflecting member after a period of time, to permit the flow deflecting member to pivot to an inactive position wherein the flow deflecting member no longer overlies the exhaust area of the nozzle.

5 Claims, 5 Drawing Figures

DEFLECTION DEVICE FOR ROCKET MOTOR PROPELLED PROJECTILES

The present invention relates to a deflection device for rocket motor propelled projectiles, comprising a deflection member in the form of a flap arranged to achieve a deflecting pulse through deflection of the direction of the jet of gas flowing out through the nozzle of the rocket motor.

Deflection devices of this kind, usually called "spoilers," are used for projectiles that can be deflected, e.g. missiles, in order to achieve an effective deflection function during the starting phase. Owing to the low velocity of the projectile during this stage, it is difficult to achieve the deflecting forces required for a rapid change of course with conventional aerodynamic rudders. By using a so-called spoiler, part of the thrust of the rocket motor can be utilized to obtain the deflection function desired.

For deflection of missiles during the starting phase, a number of comparatively complicated and expensive designs have been used. In many cases, it has been necessary to use command deflection or some form of programmed deflection. In order to eliminate the need for such complicated equipment, according to the invention, a deflection device has been achieved which is simple and cheap to manufacture, and has a high degree of functioning reliability. The device according to the invention is characterized generally in that the deflection member is rotatably supported from an active position, in which it extends into the exhaust area of the nozzle, and is blocked by means of a locking member which can be released, to an inactive position outside the exhaust area of the nozzle.

A further application, in which spoilers have previously not been used, but for which the device according to the invention is extremely well suited, is for intentional deflection of rockets laterally, in order to improve the dispersion of a salvo of rockets, for the purpose of achieving an optimal total effect of the rocket salvo in the target.

Figure 2:
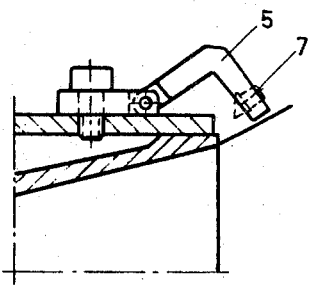
Figure 3:
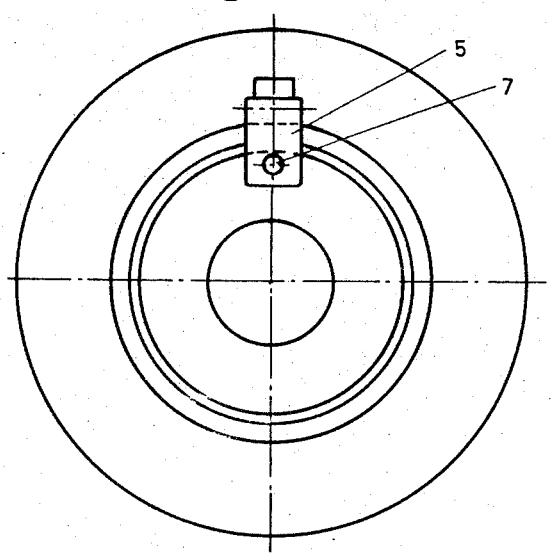
Figure 4:
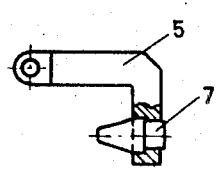
Figure 5:
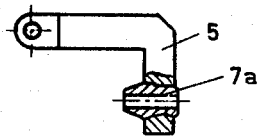

The invention will be described in more detail with reference to the attached drawings, in which FIG. 1 shows a longitudinal section of a rocket nozzle provided with the deflection device according to the invention in the active position, FIG. 2 shows a part of the nozzle shown in FIG. 1 but with the deflection device in the inactive or turned out position, FIG. 3 is an end view of the nozzle shown in FIG. 1, and FIGS. 4 and 5 show two different embodiments of the locking member for the movable flap of the deflection device.

FIG. 1 shows the rear end of a rocket provided with a nozzle 1 arranged in a rocket casing 2. At the casing 2, by means of a screw 3, a holder 4 is fastened, which comprises the fastening device for an angular or L-shaped flap 5. One end of the L-shaped flap 5 is hinged to the holder 4 by means of a hinge pin 6, while its other end extends into the exhaust area of the nozzle 1, as will be noted most clearly from FIG. 3. In the position shown in FIGS. 1 and 3 the flap is blocked by means of a pin 7 in a hole drilled in the flap, which pin engages in the inside of the rear end of the nozzle 1. The pin 7 is made of a material that erodes under the influence of the propellent gases from the rocket motor which flow out through the nozzle. Appropriate materials for the pin are e g aluminium or copper alloys.

When the rocket motor has started, the pin 7, under the influence of the propellent gases, will be subjected to weakening erosion, so that after a pre-determined period of time, it will no longer be capable of retaining the flap 5 in the active position shown in FIGS. 1 and 3. Under the influence of the pressure from the jet of gas, the flap will then be turned out to the position shown in FIG. 2. In this position the flap is outside the jet of gas but inside the outer diameter of the rocket casing, and therefore no longer performs any deflecting function.

FIGS. 4 and 5 show how the active time of the deflection device can be varied in order to obtain the deflecting pulse desired. In FIG. 4 the flap 5 is provided with a homogeneous pin 7, which gives a comparatively long time before the flap 5 is turned out, while the pin 7a shown in FIG. 5 has been made with a weakening recess, which permits more rapid erosion of the pin and thereby reduces the time until the flap is turned out.

The time for turning out the flap can also be varied through the use of pins made of different materials. A pin made of hard material with a high melting point gives a longer time before the flap is turned out than a pin made of softer material with a low melting point.

By applying one of these methods, or a combination of both, it is possible, through simple means, to regulate the active time of the flap 5 within wide limits and with good precision, to suit the length of the deflecting pulse desired.

When rockets are fired, a comparatively short functioning time of the deflection device is required in order to obtain a deflection of the size and direction desired. The rotation which almost always arises as a consequence of e g deformity of the projectile, efficiently counteracts the deflection function intended. With the device now proposed, it has proved to be possible to utilize the period of time — often less than half a second after the firing — during which the rocket, owing to its inertia, has not had time to rotate to any significant extent. A possibility has thereby been created to deflect the individual rockets in a salvo of rockets, so that a better pattern of hits is obtained.

When firing e g a rocket salvo from an aircraft, with the previously known technology, too little lateral dispersion of the rockets is usually obtained, so that the hit pattern, depending upon the movement of the aircraft, will have the form of an elongate, narrow band. Small sight or manoeuvring errors can then have the result that the entire salvo hits points at the side of the target. Through the use of the deflection device according to the invention, the rockets can simply and efficiently be given a deflecting pulse of the size and direction desired during the starting phase, so that an optimal dispersion of the rocket salvo from the point of view of effect will be achieved. It should be obvious that the device, at a small cost, considerably improves the probability of hitting of such a rocket salvo.

We claim:

1. A deflection device for rocket motor propelled projectiles, comprising a deflection member in the form of a flap arranged to achieve a deflecting pulse through deflection of the direction of the jet of gas flowing out through the nozzle of the rocket motor, the deflection member being rotatably supported from an active position, in which it extends into the exhaust area of the nozzle and is blocked by means of a locking member which can be released, to an inactive position outside the exhaust area of the nozzle, said locking member consisting of a pin made of a material that is sensitive to erosion under the influence of the jet of gas.

2. A device according to claim 1 wherein the pin is made with a weakening recess.

3. A deflection device for a rocket propelled projectile arranged to achieve a deflecting pulse by deflecting the direction of flow of a gas jet issuing from the nozzle of a rocket motor, said deflection device comprising a flow deflecting member pivotally attached to the rocket motor and extending from its pivotal attachment to an active position wherein said flow deflecting member overlies a portion of the exhaust area of the nozzle, means for temporarily retaining said flow deflecting member in said active position comprising a locking member engaging said flow deflecting member to temporarily prevent pivotal movement of said flow deflecting member about its pivotal attachment, said locking member being positioned within the path of flow of said gas jet and being responsive to the influence of said gas jet for releasing said flow deflecting member after a period of time to permit said flow deflecting member to pivot about its pivotal attachment to an inactive position wherein said flow deflecting member no longer overlies the exhaust area of the nozzle.

4. The structure of claim 3 wherein said flow deflecting member comprises an L-shaped member having a first leg pivotally attached to the rocket motor at a location exterior of said nozzle and having a second leg extending transverse to said first leg over an edge of said nozzle at the exhaust end of the nozzle, said locking member comprising a pin extending from said second leg into engagement with said nozzle edge at the interior of said nozzle, said pin being fabricated of a material adapted to be melted by the gas jet flowing through said nozzle.

5. The structure of claim 4 wherein said nozzle includes a casing, said nozzle being located within said casing, said first leg being pivotally attached to said casing, said deflecting member, when released and pivoted to its said inactive position, being located outside the exhaust area of said nozzle but within the outer diameter of said casing.

* * * * *